United States Patent Office
3,083,251
Patented Mar. 26, 1963

3,083,251
FUEL CELL ELECTROLYTES
Anthony M. Moos, Ossining, N.Y., assignor to Leesona Corporation, Cranston, R.I., a corporation of Massachusetts
No Drawing. Filed Sept. 28, 1960, Ser. No. 58,889
4 Claims. (Cl. 136—86)

This invention relates to improved fuel cells and more particularly to fuel cells utilizing alkanolamines and their derivatives as the fuel cell electrolyte. Such cells are operated with porous fuel and oxygen electrodes which are separated by an electrolyte.

"Fuel cell," for purposes of this specification, is understood to be an electrochemical cell in which the free energy of combustion of the fuel is converted directly into electrical energy. The fuel and oxygen electrodes of the cell are generally constructed as hollow bodies with the outer surface maintained in contact with the electrolyte and the fuel and oxygen respectively, being passed into the hollow interior of the electrode. Alternatively, the electrodes are constructed so that one surface is maintained in contact with the electrolyte while the fuel or oxygen gases are passed on one side, or caused to come in contact with the other surface. It is also possible and at times advantageous to admix the fuel of the cell directly with the electrolyte. If such is the case, the fuel electrode can be constructed as a plate, rod, or some other suitable design.

As the fuel and oxygen are passed through or contacted with the electrodes, they are adsorbed in the pores of the respective electrode and de-adsorbed in the form of ions, leaving the electrodes electrically charged. Oxygen is thus adsorbed and de-adsorbed as $O^-$ ions, leaving the oxygen electrode positively charged and hydrogen is absorbed and de-adsorbed as $H^+$ ions leaving the electrode negatively charged. The electrical current is drawn off through an external route.

In constructing an efficient fuel cell, the problem encountered is basically one of chemical kinetics, the object being to carry out the reaction of the fuel gas and oxidizing gas in such a manner that the proportion of free energy degraded into heat is as small as possible. Yet, it is necessary that the activity of the cell be sufficiently high so that the energy output from practical sized cells can be economically attained.

The chemistry of fuel cells is not new. The earliest work dates back to as early as 1839 when Grove made several attempts to carry out the electrochemical oxidation of fuels. As early as 1890 the chemistry of fuel cells apparently was clearly understood and thoroughly appreciated. However, it was not until recently that work on fuel cells received renewed impetus, spurred by such developments as the bi-porous electrode of Francis T. Bacon which brought about more efficient control of the three-phase interface of solid, gas and electrolyte within the electrodes where the adsorption and de-adsorption of the oxidizing and fuel gases occurs. These developments have made it apparent that a fuel cell can be commercially feasible and thus, fuel cells have become the object of concentrated research.

A large amount of the research has been expended upon the catalytic surface of the electrode and to some extent concurrent work has been going forward in developing more efficient electrolytes. The early work in the electrolyte area has been directed toward the use of solid and fused electrolytes such as the alkali and alkaline earth carbonates as well as alkali hydroxides. More recently, in the development of low and medium temperature fuel cells, aqueous electrolytes of alkali hydroxides including eutectic mixtures of the hydroxides have received considerable attention. In the process of dissociation, these strongly basic materials produce large numbers of hydroxyl ions which readily transfer oxygen ions to the fuel electrode where, as for example, hydrogen ions react with oxygen ions to form molecules of water.

For an efficient fuel cell, it is necessary that the electrolyte remain invariant and have a high ionic conductivity. When the electrolyte undergoes chemical change through reaction with the fuel gas or oxidation by the oxidizing gas, it is necessary to replenish or exchange the electrolyte in order to maintain the high activity and corresponding high current density of the fuel cell. A particularly serious problem is encountered when carbonaceous fuels are used since carbon dioxide is produced as a by-product. This practically precludes the use of electrolytes containing alkali metal hydroxides, or other compositions which form insoluble carbonates. The formation of insoluble carbonates within the cell raises the melting point of the electrolyte and reduces the overall efficiency of the cell by increasing the internal resistance and/or by blocking the porous electrodes with insoluble matter. It is apparent from thermodynamic consideration, that fuel cells utilizing carbonaceous fuels do not necessarily require high operating temperatures. The use of high temperatures in the prior art cells generally result from the nature of the solid or molten electrolyte used.

Accordingly, it is an object of the instant invention to provide new and improved electrolytes for fuel cells employing carbonaceous fuels.

It is a further object of the invention to provide a fuel cell which has a high degree of activity for a long period of time which operates at low or medium temperatures.

It is a further object of the invention to provide a fuel cell wherein the electrolyte remains substantially invariant.

It is still a further object of the invention to provide an improved fuel cell wherein the corrosive and side reaction problems are substantially minimized.

It is still another object of the invention to provide a method of making an improved fuel cell. These and other objects of the invention will be seen from the following detailed description with particular reference given to the specific illustrative example.

According to the instant invention, a fuel cell is constructed for use with carbonaceous fuels which is operated at medium and low temperatures. This object is accomplished by using as the electrolyte, an alkanolamine or a derivative of an alkanolamine. It has been found that such materials, as electrolytes, are particularly advantageous in use with carbonaceous fuels since they readily absorb the carbon dioxide liberated during the reaction. Thus, the alkanolamines can be used either singly or in combination as electrolytes. It has been found that efficient operation of the cell can be carried out at temperatures ranging from about 25–185° C. The operating temperature of the fuel cell should be maintained at a point at which the ionic conductivity of the electrolyte is at an optimum.

Alkanolamines and their derivatives found particularly advantageous are those which contain not more than about 16 carbon atoms in their molecule. It is possible that the alkanolamines be substituted with groups such as

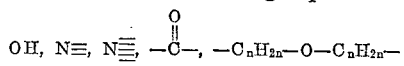

so long as the substituents do not react with the fuel or oxidizing gas. Compounds which have been found particularly advantageous as fuel cell electrolytes are the following:

- Monoethanolamine
- Diethanolamine
- Triethanolamine
- Methyl ethanolamine
- N,N-dimethyl ethanolamine
- N,N-diethyl ethanolamine
- N-acetyl ethanolamine
- N-aminoethyl ethanolamine
- N,N-diisopropyl ethanolamine
- Di(2-ethylhexyl) ethanolamine It may be desirable at times to enhance the conductance of these electrolytes by the addition of organic compounds commonly miscible with alkanolamines and their derivatives and having high dielectric constants. Representative compounds which may be used are urea, formamide, monomethyl formamide, and dimethyl formamide.

In a fuel cell utilizing the instant electrolytes, fuels such as hydrogen, carbon monoxide, methanol, methane, propane and kerosene vapors have been found to be particularly advantageous. However, other carbonaceous fuels can be employed. In the instant fuel cells the potential danger of solid carbon formation within the cell, causing blocking of the gas passages, and corresponding loss of energy, in the electrodes is to a large extent eliminated.

Electrodes commonly used in the industry can be employed with the instant fuel cells. The bi-porous electrodes developed by Francis T. Bacon, mentioned earlier, have been found to be particularly advantageous. However, by the use of the instant electrolyte, it is also possible to admix the fuel directly with the electrolyte as disclosed in the Justi et al. Patent 2,925,454. Since the polarity of the electrolyte can be controlled to a large extent by the length of the carbon chain as well as by the number of polar groups substituted in the chain, it is possible by judicious selection of the alkanolamine electrolyte and fuel gas, to obtain relatively easy solution or dispersion of the fuel. It is not necessary that the fuel gas and electrolyte be in true solution but the fuel may be present in the electrolyte as a colloidial dispersion or the fuel and electrolyte may be emulsified. When the fuel is admixed directly with the electrolyte, it is not necessary to use the more expensive bi-porous electrode structures.

A typical embodiment of the fuel cell using an electrolyte of the instant invention is as follows:

*Example*

A fuel cell was constructed in a suitable metal housing containing a metallic silver activated carbon plate as the oxidizing electrode and a bi-porous nickel electrode as described in the Bacon British Patent No. 667,298, as the fuel electrode. The oxidizing and fuel electrodes were separated by a solution of mono-ethanolamine. Carbon monoxide was passed on one side of the fuel electrode and air, as the oxidizing gas, was passed on one side of the oxidizing electrode. The cell was operated at a temperature of 100° C. The cell under these operating conditions was catalytically activated and demonstrated a high degree of electrochemical stability. There was no evidence of the cell being either oxidized or reduced.

It should be appreciated that this invention is not to be construed by the illustrative example. It is still possible to produce other embodiments without departing from the inventive concept earlier disclosed. Such embodiments are within the ability of one skilled in the art.

What is claimed is:

1. In a fuel cell for the consumption of carbonaceous fuels comprising a housing, an electrolyte, and at least two electrodes, the improvement wherein the electrolyte is primarily an alkanolamine having from 1–16 carbon atoms, said alkanolamine absorbing carbon dioxide reaction by-products and containing only substituted substituents selected from the group consisting of hydroxyl, trivalent nitrogen, pentavalent nitrogen, carbonyl, and ether groups and which remains substantially invariant under the operating conditions of the cell.

2. The fuel cell of claim 1 wherein the alkanolamine is monoethanolamine.

3. The fuel cell of claim 1 wherein the alkanolamine electrolyte is modified with an organic compound having a high dielectric constant selected from the group consisting of urea, formamide, monomethyl formamide and dimethyl formamide.

4. The fuel cell of claim 1 wherein the cell is operated at a temperature of from about 25–185° C.

References Cited in the file of this patent

UNITED STATES PATENTS 2,880,122     Morehouse et al.     Mar. 31, 1959

FOREIGN PATENTS 667,298     Great Britain     Feb. 27, 1952